(12) United States Patent
Aurongzeb et al.

(10) Patent No.: US 10,088,878 B2
(45) Date of Patent: Oct. 2, 2018

(54) FLEXIBLE HEAT SPREADER WITH DIFFERENTIAL THERMAL CONDUCTIVITY

(71) Applicant: Dell Products L.P., Round Rock, TX (US)

(72) Inventors: Deeder M. Aurongzeb, Austin, TX (US); Daniel Coolidge, Pflugerville, TX (US); Richard C. Thompson, Cedar Park, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 590 days.

(21) Appl. No.: 14/570,064

(22) Filed: Dec. 15, 2014

(65) Prior Publication Data

US 2016/0170454 A1 Jun. 16, 2016

(51) Int. Cl.
*F28F 7/00* (2006.01)
*G06F 1/20* (2006.01)

(52) U.S. Cl.
CPC ..................................... *G06F 1/20* (2013.01)

(58) Field of Classification Search
CPC .............. C04B 35/522; C04B 2235/77; C04B 2235/9607; H01L 23/373; F28F 21/02
See application file for complete search history.

(56) References Cited

U.S. PATENT DOCUMENTS

| | | | |
|---|---|---|---|
| 6,469,381 B1 | 10/2002 | Houle et al. | |
| 6,982,874 B2* | 1/2006 | Smalc | G06F 1/182 165/185 |
| 7,031,162 B2 | 4/2006 | Arvelo et al. | |
| 7,969,714 B2* | 6/2011 | Wang | B60R 11/0235 345/156 |
| 8,587,945 B1* | 11/2013 | Hartmann | H05K 7/20454 361/679.53 |
| 9,267,745 B2* | 2/2016 | Southard, II | B32B 18/00 |
| 9,301,429 B2* | 3/2016 | Zhang | H01L 23/373 |
| 9,480,185 B2* | 10/2016 | Linderman | H05K 1/0203 |
| 2004/0124526 A1* | 7/2004 | Matayabas, Jr. | H01L 23/3737 257/712 |
| 2010/0321895 A1* | 12/2010 | Hill | H05K 7/20472 361/715 |
| 2013/0216887 A1* | 8/2013 | Wayne | H01M 2/1061 429/120 |

(Continued)

OTHER PUBLICATIONS

Synthesis and Characterization of Solid-State Phase Change Material Microcapsules for Thermal Management Applications. Fangyu Cao, Jing Ye, Bao Yang. Journal of Nanotechnology in Engineering and Medicine Nov. 2013, vol. 4 / 040901-1.*

(Continued)

*Primary Examiner* — Len Tran
*Assistant Examiner* — Gordon Jones
(74) *Attorney, Agent, or Firm* — Terrile, Cannatti, Chambers & Holland, LLP; Stephen A. Terrile

(57) ABSTRACT

A heat spreader which is configured using a composite of materials to provide localized heat spreading in certain directions across portions of the heat spreader while providing generalized heat spreading in multiple directions across other portions of the heat spreader. In certain embodiments, the localized heat spreading is across an XY plane and the generalized heat spreading is substantially continuous in XYZ directions.

8 Claims, 5 Drawing Sheets

(56) References Cited

U.S. PATENT DOCUMENTS

2015/0208550 A1* 7/2015 Rugg ................. H05K 7/20518
361/713
2016/0334844 A1* 11/2016 Nguyen ................ H01L 23/373

OTHER PUBLICATIONS

Development, Characterization, and Latent Heat Thermal Energy Storage Properties of Neopentyl Glycol-Fatty Acid Esters as New Solid—Liquid PCMs. Ahmet Sari, Cemil Aiken, and Alper Bicer. Department of Chemistry, Gaziosmanpaa University, Tokat, Tokat 60240, Turkey. dx.doi.org/10.1021/ie403039n | Ind. Eng. Chem. Res. 2013, 52, 18269-18275.*

NASA, Polymer Cross-Linked Aerogels (X-Aerogels), https://technology.grc.nasa.gov/tech-detail-coded.php?cid=GR-0013, printed Nov. 17, 2014.

M. Smalc et al., Thermal Performance of Natural Graphite Heat Spreaders, Proceedings of IPACK2005, Interpack 2005-73073, Jul. 17-22, 2005, http://www.graftechaet.com/getattachment/d5e2b95d-fd3e-4082-bcb8-6a175a1c5068/Thermal-Performance-of-Natural-Graphite-Heat-Sprea.aspx.

* cited by examiner

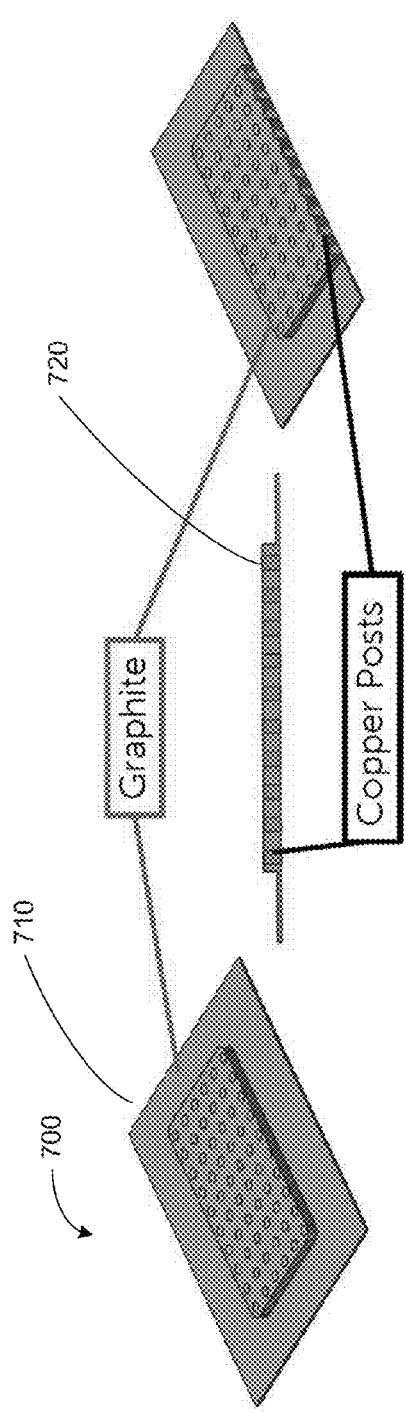
*Figure 7*
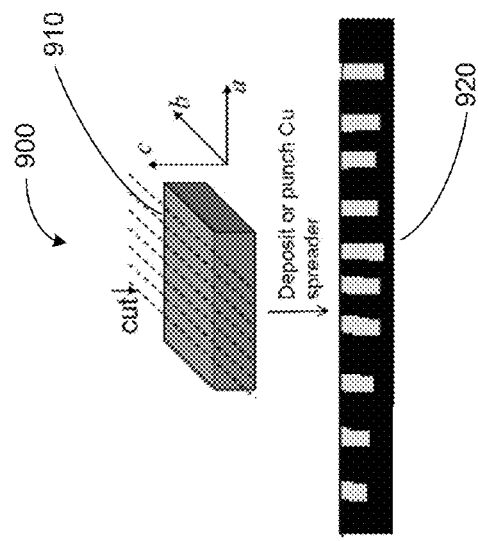
*Figure 9*
*Figure 8*

FLEXIBLE HEAT SPREADER WITH DIFFERENTIAL THERMAL CONDUCTIVITY

BACKGROUND OF THE INVENTION

Field of the Invention

The present invention relates to information handling systems. More specifically, embodiments of the invention relate to heat spreaders used with information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems, such as tablet type information handling system, are becoming smaller and thinner. As these systems become smaller and thinner, the effect of proximity becomes important especially for various key components of the information handling system. For example, an organic light emitting diode (OLED) type display device is often very sensitive to heat and also often will not be having fan due to thin nature of the system. Additionally, information handling systems which include OLED type display devices may be flexible with a usage case that may include repetitive bending of the housing of the information handling system. Often times, it becomes important to provide thermal heat spreading high in a first plane (e.g., an XY plane) but may need to stop or slow down in a second plane (e.g., a −XY plane, i.e., in plane positioned in an opposite direction of the first plane). This issue may be present due to another heating element present in the second plane.

Another example of a component in which heat spreading is important are batteries included within the information handling system. As products become thinner it is desirable to reduce external packaging around the battery cells. For example, certain known batteries are encapsulated with Mylar type insulating plastic with a frame or may be fitted with a steel plate to minimize battery thickness while meeting safety criteria. Such a battery structure is often sufficient for battery internal performance but may not be sufficient to reduce heat dissipation effects from an external radiation source such as from wireless charging or other antenna structure such as a microwave (mm-wave) type communication antenna. The amount of heat the battery is exposed to can often become worse over time causing the battery to swell. Additionally, exposure to heat can further accelerate the amount of swelling, leading to battery performance degradation. Certain known batteries include a gap (which may be up to 10% of the size of the battery) for swelling. Accordingly, with certain battery components it is desirable to provide a heat spreader which is elastic and strong while spreading heat in a first direction (e.g., an XY direction) but slows down heat dissipation in another direction (e.g., in a Z direction).

It is known to use copper (Cu) and graphene based heat spreaders. Cu based heat spreaders conduct heat in all direction equally, while graphene based heat spreaders spread heat in X-Y plane almost 1000× higher than Z direction.

SUMMARY OF THE INVENTION

In accordance with the present invention, a heat spreader is disclosed which is configured using a composite of materials to provide localized heat spreading in certain directions across portions of the heat spreader while providing generalized heat spreading in multiple directions across other portions of the heat spreader. In certain embodiments, the localized heat spreading is across an XV plane and the generalized heat spreading is substantially continuous in XYZ directions.

Additionally, in certain embodiments, the first portion of the head spreader comprises graphene and the second portion of the heat spreader comprises a solid-solid phase change material. In certain embodiments, the graphene is composed of a 70% purity, has a conductivity in low 100 W/MK at 5 um and saturates at >50 um with up to 800 w/mk. In another embodiment, the first portion of the heat spreader comprises graphene which comprise a plurality of indentations on one side where the indentations are filled with insulating resin. Such a configuration stops heat spreading in one direction. Additionally, in certain embodiments, a metal (such as copper) is incorporated into the first portion of the heat spreader. The metal increases the rigidity of the first portion, thus providing local rigidity for a large surface heat spreader. Also, in certain embodiments, the metal comprises metal posts which are incorporated by depositing or punching a spreader on a thermoformed graphene composite slab. Additionally, in certain embodiments, the heat spreader is semi-flexible while having multiple conduction insulating zones.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 7 shows relationships between a perspective, cross sectional and perspective cross sectional views of a portion of an alternate heat spreader.

FIG. 8 shows a flow chart of steps involved in fabricating another alternate heat spreader.

FIG. 9 shows perspective and cross sectional views of a portion of an alternate heat spreader.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
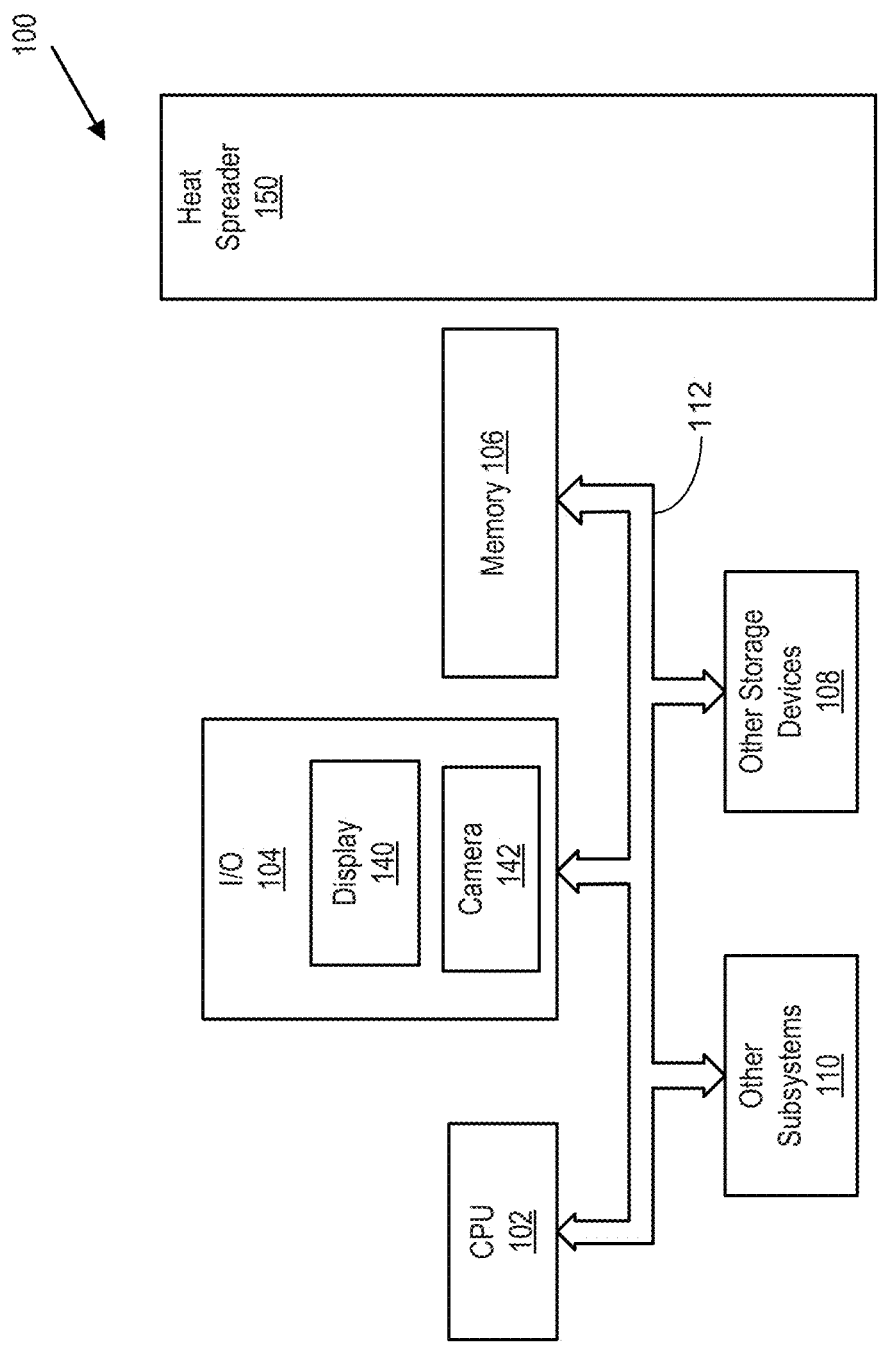
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, memory 106, and various other subsystems 108. The information handling system 100 likewise includes other storage devices 110. The components of the information handling system are interconnected via one or more buses 112. In certain embodiments, the I/O devices 104 include a display 140 as well as a camera 142. Also, the information handling system 100 includes a heat spreader 150 disposed to dissipate heat away from at least some of the components of the information handling system 100.

The heat spreader 150 is configured using a composite of materials to provide localized heat spreading in certain directions across portions of the heat spreader while providing generalized heat spreading in multiple directions across other portions of the heat spreader. In certain embodiments, the localized heat spreading is across an XY plane and the generalized heat spreading is substantially continuous in XYZ directions.

Additionally, in certain embodiments, the first portion of the heat spreader comprises a graphene (i.e., a crystalline allotrope of carbon with two dimensional properties where carbon atoms are densely packed in a bonded hexagonal pattern) composite slab and the second portion of the heat spreader comprises a solid-solid phase change material such that the first portion provides localized heat spreading across an XY plane and the second portion provides generalized heat spreading is substantially continuous in XYZ directions. In certain embodiments, the graphene is composed of a 70% purity, has a conductivity in low 1.00 W/MK at 5 um and saturates at >50 um with up to 800 w/mk. In another embodiment, the first portion of the heat spreader comprises graphene which comprise a plurality of indentations on one side where the indentations are filled with insulating resin. Such a configuration stops heat spreading in one direction. Additionally, in certain embodiments, the second portion of the heat spreader comprises a metal composite such as a Molybdenum Copper (MoCu) composite.

Additionally, in certain embodiments, a metal (such as copper) is incorporated into the first portion of the heat spreader. The metal increases the rigidity of the first portion, thus providing local rigidity for a large surface heat spreader. Also, in certain embodiments, the metal comprises metal posts which are incorporated by depositing or punching a spreader on a thermoformed graphene composite slab.

Figure 2:
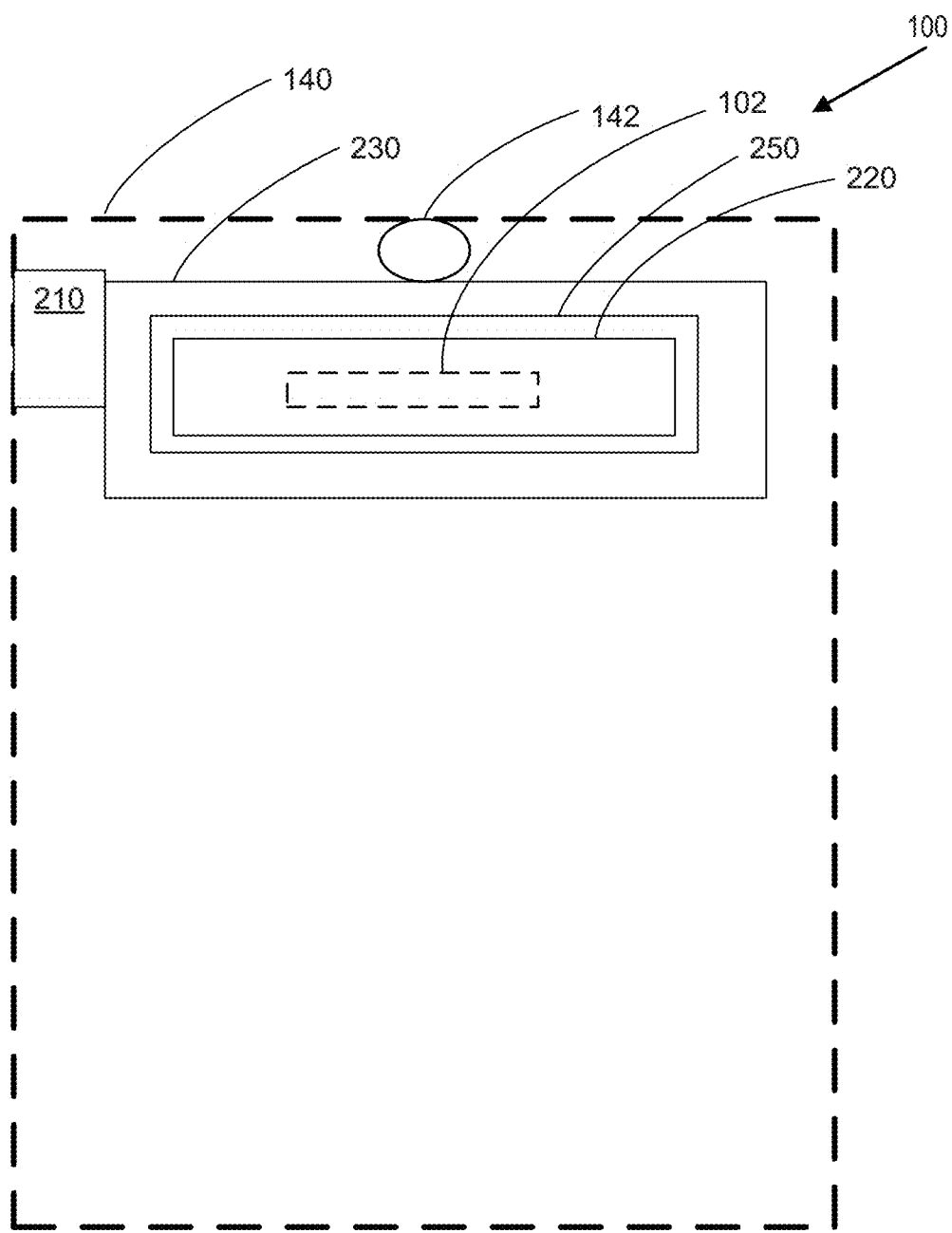
FIG. 2 shows a block diagram of components of an information handling system including a heat spreader.

Referring to FIG. 2, a block diagram of components of an information handling system 100 including a heat spreader 150 is shown. More specifically, the information handling system 100 corresponds to a tablet type information handling system where the processor 102 is positioned below the heat spreader 150. Also substantially contiguous to at least a portion of the heat spreader are a camera 142 (such as a three dimensional camera) as well as a controller 210 for the display device 140 which is disposed across the top of the information handling system 100.

The heat spreader includes a first portion 220 and a second portion 230. By positioning the second portion 230 of the heat spreader 150 contiguous with the camera, the heat spreader dissipates heat and also provides structural integrity to a portion of the information handling system that would otherwise be somewhat weakened structurally (e.g., due to the aperture needed for the camera in the housing of the information handling system. Also, by positioning the heat spreader with the first portion 230 of the heat spreader over the processor, heat generated by the processor is distributed along the horizontal axis away from the processor 102 and towards the edges of the information handling system 100. Such a heat spreading also distributes the heat away from the display device 140 of the information handling system. In certain embodiments, the first portion 220 and the second portion 230 of the heat spreader are thermally insulated via a thermal insulator 250 such as a resin insulator.

Figure 4:
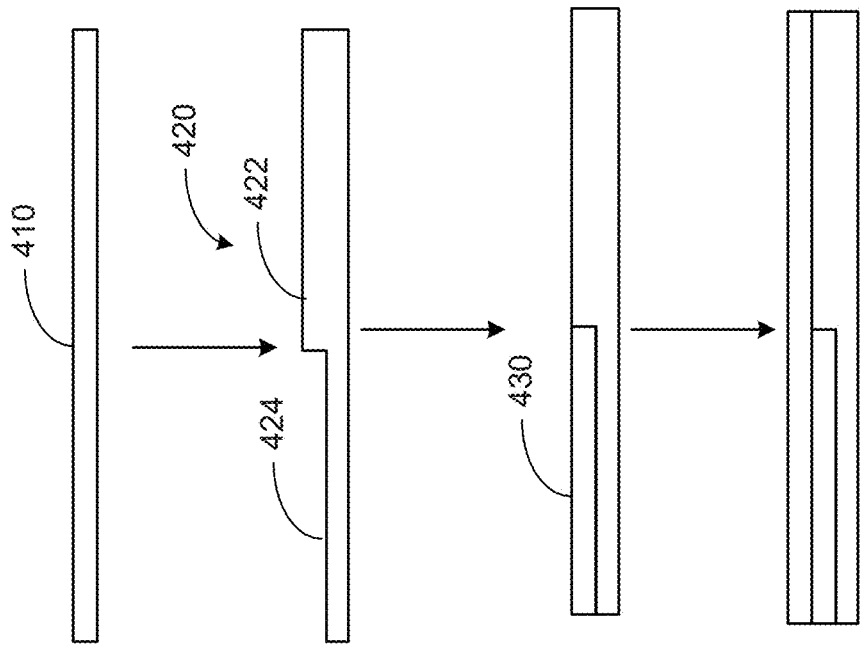
FIG. 4 shows cross sectional views of a heat spreader during fabrication.
Figure 3:
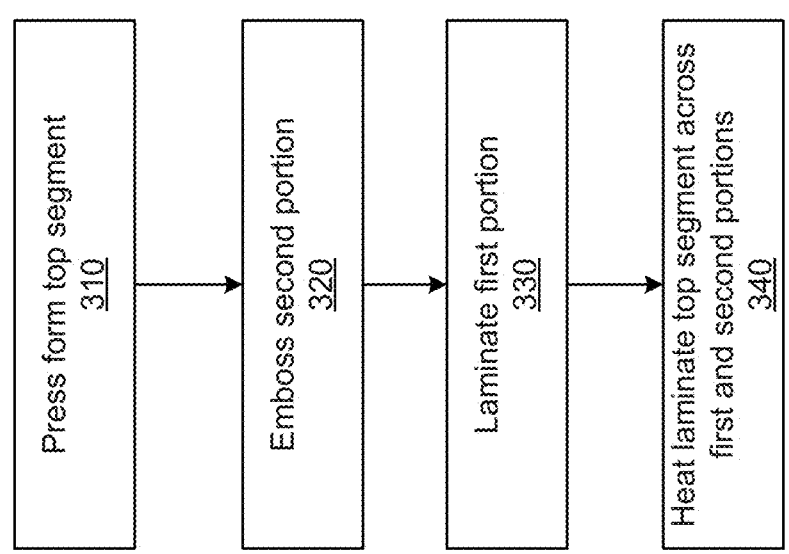
FIG. 3 shows a flow chart of the steps involved in fabricating a heat spreader.

Referring to FIGS. 3 and 4, a flowchart of the steps involved in fabricating a heat spreader and cross sectional views of a heat spreader during fabrication are shown. More specifically, at step 310 a segment of TPE filled graphene 410 is press formed to correspond to the overall length and width of the heat spreader. In certain embodiments, this segment is substantially (i.e., +/−5%) of 20 micrometers. Next at step 320, a second portion is embossed. In certain embodiments, the second portion includes a graphene spreader 420 which is embossed and formed to include a full height portion 422 and a stepped portion 424. In certain embodiments, the full height portion 422 has a height of substantially 100 (i.e., +/−5%) micrometers and the stepped portion 424 is substantially 80 micrometers (i.e., +/−5%). Next, at step 330, a first portion is thermally coupled to the second portion. In certain embodiments, the first portion includes a solid-solid phase change material 430 which is laminated to be within the stepped portion 424 of the heat spreader. Next, at step 340, the TPE filled graphene 410 is heat laminated across the first and second portions of the heat spreader. In certain embodiments, this top portion is laminated across the top of the heat first and second portions of the heat spreader.

Figure 5:
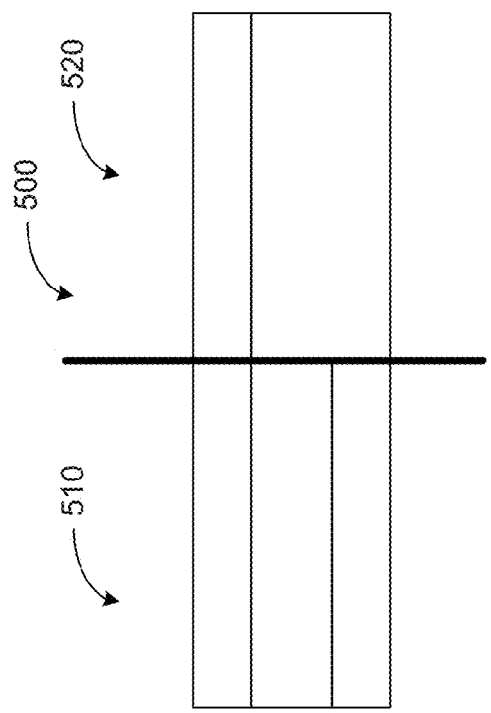
FIG. 5 shows a cross sectional view of a heat spreader.

FIG. 5 shows a cross sectional view of a heat spreader 500. More specifically, the heat spreader 500 includes a portion 510 with provides high XY thermal conductivity (e.g., 200-1500 W/MK) and low Z thermal conductivity (e.g., 0.05-10 W/MK). The heat spreader also includes a portion 520 which provides high XY thermal conductivity as well as some Z thermal conductivity. More specifically, in certain embodiments, the portion 510 includes the TPE filled graphene 410, the stepped portion 424 and the solid-solid phase change material 430. Also in certain embodiments, the portion 520 includes TPE filled graphene 410 and the full height portion 422.

Figure 6:
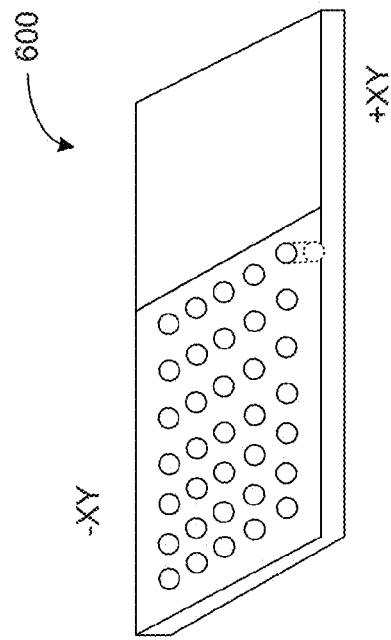
FIG. 6 shows a perspective view of an alternate heat spreader.

FIG. 6 shows a perspective view of an alternate heat spreader 600. More specifically, with the heat spreader 600, the first portion of the heat spreader comprises graphene which defines a plurality of indentations on one side where the indentations are filled with insulating resin. Such a configuration stops heat spreading in one direction. Additionally, in certain embodiments, a metal (such as copper is incorporated into the first portion of the heat spreader. The metal increases the rigidity of the first portion, thus providing local rigidity for a large surface heat spreader. Also, in certain embodiments, the metal comprises metal posts which are incorporated by depositing or punching a spreader on a thermoformed graphene composite slab.

FIG. 7 shows relationships between a perspective, cross sectional and perspective cross sectional views of a portion of an alternate heat spreader 700. More specifically, indentations are defined within the graphene portion 710 of the heat spreader. This graphene portion 710 is then provided with copper posts 720 within each of the indentations.

Referring to FIG. 8 and FIG. 9, a flow chart 800 of steps involved in fabricating another alternate heat spreader 900 and perspective 910 and cross sectional views 920 of a portion of an alternate heat spreader are shown. More specifically, at step 810 a graphene spreader is thermoformed. In certain embodiments, the graphene spreader is substantially 1 mm thick. Next, at step 820, features are either cut or embossed across the top of the graphene spreader. Next, at step 830 a thermally conductive material is deposited or punched into the graphene spreader. In certain embodiments, the thermally conductive material comprise copper.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A heat spreader comprising:
a segment of graphene, the segment of graphene being press formed to correspond to an overall length and width of the heat spreader;
a graphene spreader, the graphene spreader being embossed and formed to include a full height portion and a stepped portion;
a solid-solid phase change material, the solid-solid phase change material being laminated to be within the stepped portion of the graphene spreader;
a portion of the segment of graphene and the full height portion providing a first portion, the first portion providing localized heat spreading in certain directions across the heat spreader; and,
another portion of the segment of graphene, the solid-solid change material and the stepped portion providing a second portion, the second portion providing generalized heat spreading in multiple directions across the heat spreader, the second portion of the heat spreader being positioned laterally contiguous with a camera of an information handling system, the second portion of the heat spreader providing structural integrity to a portion of a housing of the information handling system defining an aperture associated with the camera; and wherein
the information handling system comprises a tablet type information handling system; and,
the display is disposed across a top of the tablet type information handling system.

2. The heat spreader of claim 1, wherein:
the localized heat spreading is across an XY plane of the heat spreader and the generalized heat spreading is substantially continuous in XYZ directions across the heat spreader.

3. The heat spreader of claim 1, wherein:
a thermally conductive metal is incorporated into the first portion of the heat spreader.

4. An information handling system comprising:
a housing;
a processor;
a bus coupled to the processor;
a camera;
a display; and
a heat spreader thermally coupled to the processor, the heat spreader comprising
a segment of graphene, the segment of graphene being press formed to correspond to an overall length and width of the heat spreader;
a graphene spreader, the graphene spreader being embossed and formed to include a full height portion and a stepped portion;
a solid-solid phase change material, the solid-solid phase change material being laminated to be within the stepped portion of the graphene spreader;
a portion of the segment of graphene and the full height portion providing a first portion, the first portion providing localized heat spreading in certain directions across the heat spreader; and,
another portion of the segment of graphene, the solid-solid change material and the stepped portion providing a second portion, the second portion providing generalized heat spreading in multiple directions across the heat spreader, the second portion of the heat spreader being positioned laterally contiguous with the camera of the information handling system, the second portion of the heat spreader providing structural integrity to a portion of the housing of the information handling system defining an aperture associated with the camera; and wherein
the information handling system comprises a tablet type information handling system; and,
the display is disposed across a top of the tablet type information handling system.

5. The system of claim 4, wherein:
the localized heat spreading is across an XY plane of the heat spreader and the generalized heat spreading is substantially continuous in XYZ directions across the heat spreader.

6. The system of claim 4, wherein:
a thermally conductive metal is incorporated into the first portion of the heat spreader.

7. The heat spreader of claim 1, wherein:
the first portion of the heat spreader is positioned over the processor of the information handing system, the first portion of the heat spreader extending laterally beyond a footprint of the processor, the first portion of the heat spreader distributing heat away from the processor and towards edges of the information handling system.

8. The system of claim 4, wherein:
the first portion of the heat spreader is positioned over the processor of the information handling system, the first portion of the heat spreader extending laterally beyond a footprint of the processor, the first portion of the heat spreader distributing heat away from the processor and towards edges of the information handling system.

* * * * *